(12) United States Patent
Xu

(10) Patent No.: US 10,745,953 B2
(45) Date of Patent: Aug. 18, 2020

(54) SUPPORT DEVICE AND FOLDING FURNITURE HAVING THE SAME

(71) Applicant: Dongguan Coomo Furniture Co., Ltd., Dongguan (CN)

(72) Inventor: Guofang Xu, Dongguan (CN)

(73) Assignee: DONGGUAN COOMO FURNITURE CO., LTD., Dongguan, Guangdong (CN)

(*) Notice: Subject to any disclaimer, the term of this patent is extended or adjusted under 35 U.S.C. 154(b) by 73 days.

(21) Appl. No.: 16/321,934

(22) PCT Filed: Jan. 11, 2019

(86) PCT No.: PCT/CN2019/071433
§ 371 (c)(1),
(2) Date: Jan. 30, 2019

(87) PCT Pub. No.: WO2019/141137
PCT Pub. Date: Jul. 25, 2019

(65) Prior Publication Data
US 2019/0368254 A1    Dec. 5, 2019

(30) Foreign Application Priority Data

Jan. 16, 2018 (CN) .................... 2018 2 0087544 U
Dec. 29, 2018 (CN) .................... 2018 2 2269272 U

(51) Int. Cl.
*E05F 1/10* (2006.01)
*A47B 67/00* (2006.01)
(Continued)

(52) U.S. Cl.
CPC .............. *E05F 1/105* (2013.01); *A47B 67/00* (2013.01); *E06B 3/385* (2013.01); *F16H 21/40* (2013.01);
(Continued)

(58) Field of Classification Search
CPC ....... E05F 1/105; E05F 1/1276; E05F 1/1058; E05D 15/582; E05D 11/087; A47B 67/00;
(Continued)

(56) References Cited

U.S. PATENT DOCUMENTS 2,903,149 A  *  9/1959  Turner ................. E05F 1/1058
                                                       217/60 E
5,904,411 A  *  5/1999  Hayakawa ............ E05D 15/582
                                                       16/289

(Continued)

FOREIGN PATENT DOCUMENTS

CN        201416325 Y      3/2010
CN        106593168 A      4/2017
(Continued)

*Primary Examiner* — Anita M King
(74) *Attorney, Agent, or Firm* — Sinorica, LLC

(57) ABSTRACT

Disclosed are a support device and a folding furniture having the support device. The support device includes a base, a support mechanism, a fixed seat, and a force providing mechanism installed to the base. The support mechanism includes a support element and a rotating element rotatably installed to the base. The support assembly has an end hinged to the fixed seat and the other end having a disassembling structure for detachably connecting the rotating element. The rotating element abuts the force providing mechanism, and the force providing mechanism is provided for supporting the rotating element. The support device has an ingenious structural design, so that the support element and the rotating element can be installed or removed conveniently, and the operation is simple and labor-saving, and the lifting operation of the support element has the features of stable operation, low noise, and high practicality.

10 Claims, 6 Drawing Sheets

(51) Int. Cl.
*E06B 3/38* (2006.01)
*F16H 21/40* (2006.01)
*F16H 25/16* (2006.01)

(52) U.S. Cl.
CPC .......... *F16H 25/16* (2013.01); *E05Y 2201/47* (2013.01); *E05Y 2900/20* (2013.01)

(58) Field of Classification Search
CPC .......... E06B 3/385; F16H 21/40; F16H 25/16; E05Y 2201/47; E05Y 2900/20
See application file for complete search history.

(56) References Cited

U.S. PATENT DOCUMENTS

| | | | | |
|---|---|---|---|---|
| 7,178,202 | B2* | 2/2007 | Hirtsiefer | E05F 1/1261 16/366 |
| 8,894,162 | B2* | 11/2014 | Kashiwaguma | E05F 1/1058 312/319.2 |
| 8,959,709 | B2* | 2/2015 | Hasegawa | E05D 3/14 16/65 |
| 9,353,562 | B2* | 5/2016 | Oshima | E05F 1/14 |
| 10,519,707 | B2* | 12/2019 | Cappellotto | E05D 15/40 |
| 2006/0156513 | A1* | 7/2006 | Zetti | E05D 7/0423 16/288 |
| 2016/0376823 | A1* | 12/2016 | Huber | A47B 96/00 312/319.2 |
| 2019/0010747 | A1* | 1/2019 | Bohle | E05D 15/401 |
| 2019/0203947 | A1* | 7/2019 | Meurer | E05F 1/1276 |

FOREIGN PATENT DOCUMENTS

| | | |
|---|---|---|
| CN | 107461100 A | 12/2017 |
| WO | WO 2012112997 A1 | 8/2012 |
| WO | WO 2016136449 A1 | 9/2016 |

* cited by examiner

SUPPORT DEVICE AND FOLDING FURNITURE HAVING THE SAME

FIELD OF THE INVENTION

The present invention relates to the field of household products, and more particularly to a support device and a folding furniture having the support device.

BACKGROUND OF THE INVENTION

Boxes, cabinets, tables, and other furniture are essential household items for every family. At present, the door support device applied to furniture such as boxes, cabinets, and tables mainly has the following deficiencies: 1. Both installation and removal of the door support device are inconvenient, and often require a special tool to install and remove the door support device. 2. It takes much effort to open and close a door, and thus the use of furniture is not user-friendly or convenient. 3. A certain noise is produced when opening or closing the door and such noise is definitely a nuisance. 4. The working is unstable, and the operation is inconvenient.

SUMMARY OF THE INVENTION

Therefore, it is a primary objective of the present invention to overcome the aforementioned drawbacks of the prior art by providing a support device and a folding furniture having the support device, and this invention has an ingenious structural design, so that the support element and the rotating element can be installed or removed conveniently, and the operation is simple and labor-saving, and the lifting operation of the support element has the features of stable operation, low noise, and high practicality.

To achieve the aforementioned objective, the present invention provides a support device, comprising: a base, a support mechanism, a fixed seat and a force providing mechanism installed to the base, and the support mechanism comprising a support element and a rotating element rotatably installed to the base, and the support assembly having an end hinged to the fixed seat and the other end with a disassembling structure for detachably coupling the rotating element, and the rotating element abutting the force providing mechanism, and the force providing mechanism being provided for supporting the rotating element.

Further, the disassembling structure comprises a fastening element and an elastic element, and an end of the rotating element proximate to the fastening element has a fastening slot, and the middle of the fastening element is rotatably coupled to the support element, and an end of the fastening element extends into the fastening slot, and the elastic element is provided for driving the other end of the fastening element to restore its original position.

Further, the disassembling structure further comprises a mounting sleeve installed to the other end of the support assembly and a pressing element slidably installed to the mounting sleeve, and the pressing element has an end protruded from the support assembly and the other pressing element abutting the other end of the fastening element, and the pressing element and the elastic element are disposed on both sides of the fastening element respectively, and the middle of the fastening element is rotatably coupled to the mounting sleeve, and the pressing element compresses the elastic element through the fastening element.

Further, the support element comprises a first support rod, a second support rod, a hinged arm and a fixed structure, and the hinged arm has an end hinged to the fixed seat and the other end coupled to an end of the second support rod, and the other end of the second support rod is slidably coupled to an end of the first support rod, and the fixed structure is provided for limiting the second support rod at the first support rod, and the disassembling structure is installed at the other end of the first support rod.

Further, the fixed structure comprises a sliding sleeve installed to an end of the first support rod and an elastic plate installed to the first support rod, and the elastic plate is disposed between the first support rod and the second support rod, and the elastic plate has a hinged ear and an abutting plate for abutting second support rod, and the hinged ear is protruded from the first support rod and hinged to the fixed switch, and the fixed switch is provided for fixing the second support rod to the first support rod through the abutting plate.

Further, the fixed switch comprises a hinge portion hinged to the hinged ear, a handle portion coupled to the hinge portion, and a fixed portion protruded from a side of the hinge portion, and an abutting surface disposed at the top of the hinge portion, and when the fixed portion abuts the abutting plate, the abutting plate attaches the second support rod closely, so that the second support rod is fixed to the first support rod, and when the abutting surface abuts the abutting plate, the abutting plate releases the second support rod, so that the second support rod is slidably coupled to the first support rod.

Further, the force providing mechanism comprises a fixed plate, a sliding seat and a spring, and the fixed plate is installed at the base, and the sliding seat is slidably installed to the base, and the spring has an end abutting against the sliding seat and the other end abutting the fixed plate, and the rotating element abuts the sliding seat; the force providing mechanism further comprises slidably installed to the fixed plate and/or a guide rail on both sides of the sliding seat, and the guide rail is installed to the base.

Further, the support device further comprises an adjusting mechanism for adjusting a support force of the force providing mechanism, and the adjusting mechanism comprises a stud rotatably installed thereto, and a thread coupled to an adjusting element of the stud, and the adjusting element has a first adjusting bevel, and the bottom of the fixed plate has a second adjusting bevel slidably matched with the first adjusting bevel, and the fixed plate is slidably installed to the base.

Further, the fixed seat comprises a casing coupled to the support element, a fastener coupled to the casing, and an opening/closing assembly for limiting the fastener to the casing, and the fastener has a latch groove in coordination with the casing and a fastening groove in coordination with the opening/closing assembly, and the latch groove and the fastening groove are disposed at both ends of the fastener respectively, and the opening/closing element comprises an opening/closing element rotatably coupled to the casing, and an opening/closing torque spring installed between the opening/closing element and the casing, and the opening/closing torque spring has an end abutting the opening/closing element and the other end abutting the casing, and the opening/closing element has a fastening portion extending into the fastening groove, and the casing has a fastening shaft received in the latch groove.

The present invention also provides a folding furniture having a support device, and the folding furniture comprises a furniture body and a folding board hinged to the furniture body and further comprising the support device according to claim, and the base of the support device being mounted onto the furniture body, and the fixed seat of the support device being coupled to an end of the folding board and the other end of the folding board being rotatably installed to the furniture body, and the support device driving the folding board to be spread out or folded.

The present invention has the following advantageous effects: During the process of assembling the folding furniture, the fixed seat is installed to an end of the support mechanism, and the disassembling structure is installed to the other end of the support element, and then the fastening element is pressed to a position near an end of the elastic element, and the elastic element is compressed, so that the fastening element rotates around a rotation point, and an end of the fastening element away from the elastic element swings outwardly. When the an end of the rotating element having the fastening slot is plugged with the disassembling structure and/or the support element, the pressing force exerted onto the fastening element is released, and the fastening element under the effect of the elastic force of the elastic element will reset and swings, so as to extend an end of the fastening element into the fastening slot. With the fastening element in coordination with the fastening slot, the disassembling structure and the rotating element are installed. During a removal process, it simply needs to press the other end of the fastening element, such that an end of the fastening element retreats from the fastening slot to achieve the effect of removing the disassembling structure and the rotating element. In actual use, an external downward force is applied to the fixed seat, so that the fixed seat is moved downwardly, and the fixed seat drives the support element to swing downward, and the support element drives the rotating element to rotate clockwise, and the rotating element abuts the force providing mechanism and compresses the force providing mechanism. When the external force exerted on the fixed seat is eliminated, the force providing mechanism provides a support force to the rotating element, so that the rotating element stops rotating, and the support force of the force providing mechanism acts on the fixed seat through the support mechanism, so as to achieve the effect of supporting the fixed seat. The fixed seat stops moving when the applied force is eliminated, so that the fixed seat can stop at will in a certain angle to improve the stability of the fixed seat and reduce the production of noises. When the fixed seat is pulled to move upward, the fixed seat drives the support element to swing upward, and the support element drives the rotating element to rotate counterclockwise. During the process of rotating the rotating element in a counterclockwise direction, the force providing mechanism spreads out to resume its original position and abuts the rotating element. When the rotating element is rotated to a predetermined angle, the force providing mechanism provides an upward support force to the rotating element, and the support force can offset the weight of the fixed seat and the weight of the folding board mounted onto the fixed seat to reduce the labor intensity required for driving the support assemble to turn upwardly, so as to achieve the labor-saving effect and improve the efficiency of turning the support assembly upwardly. The structure of this support device has the features of ingenious design, convenient installation and removal of the support element and the rotating element, fast, simple, easy, and labor-saving operation, stable lifting operation of the support element, low noise, and high practicality.

DESCRIPTION OF THE PREFERRED EMBODIMENTS

Figure 1:
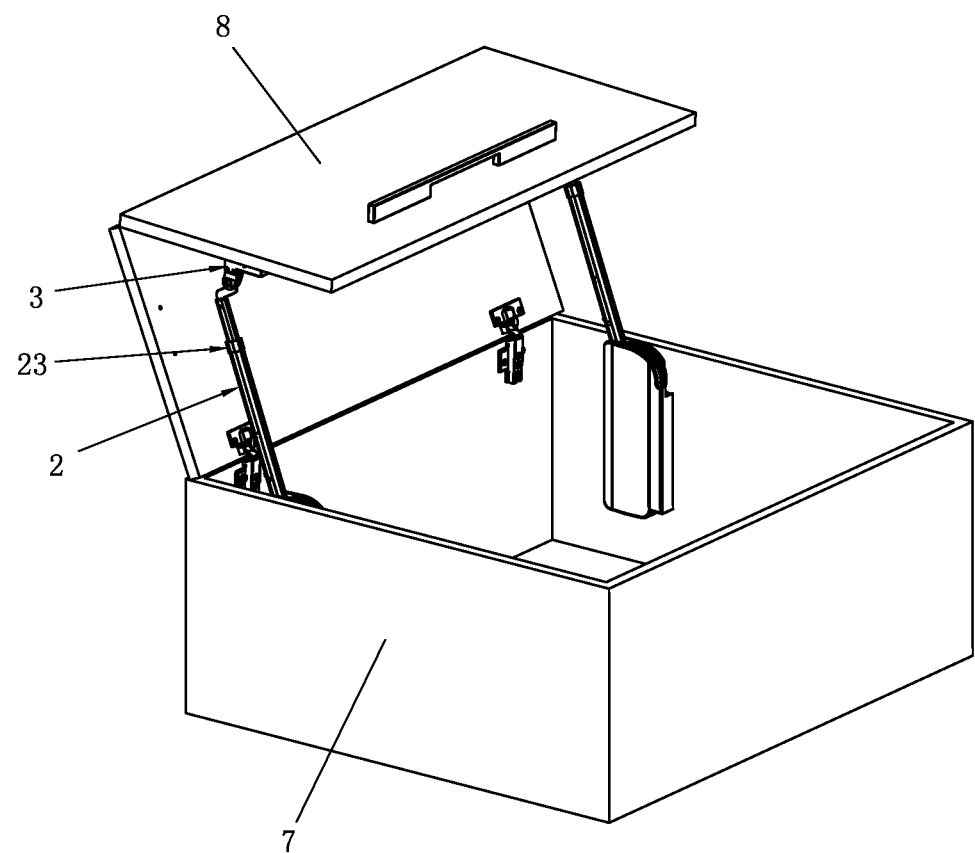
FIG. 1 is a perspective view of a folding furniture having a support device in accordance with the present invention.
Figure 2:
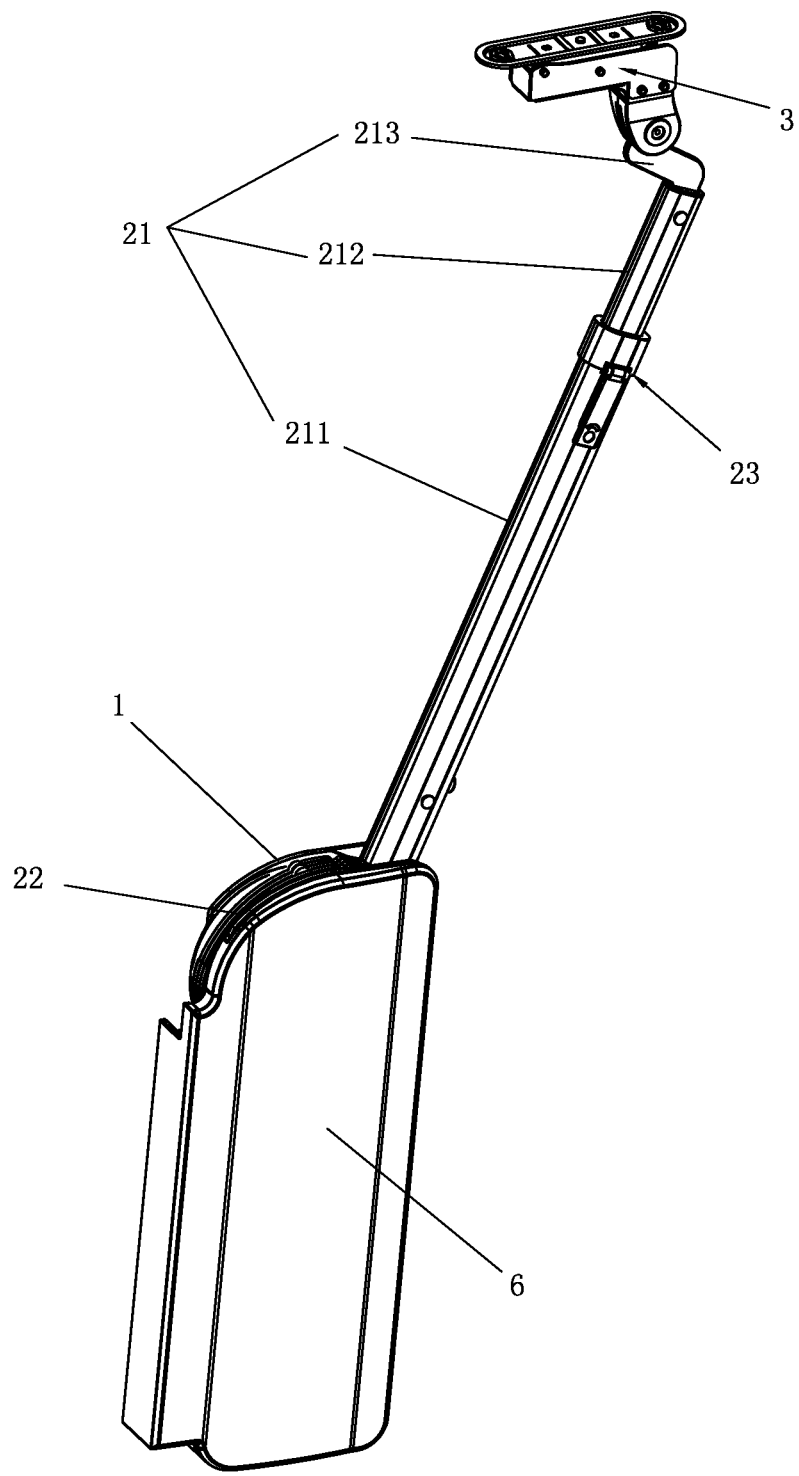
FIG. 2 is a perspective view of a support device in accordance with the present invention.
Figure 3:
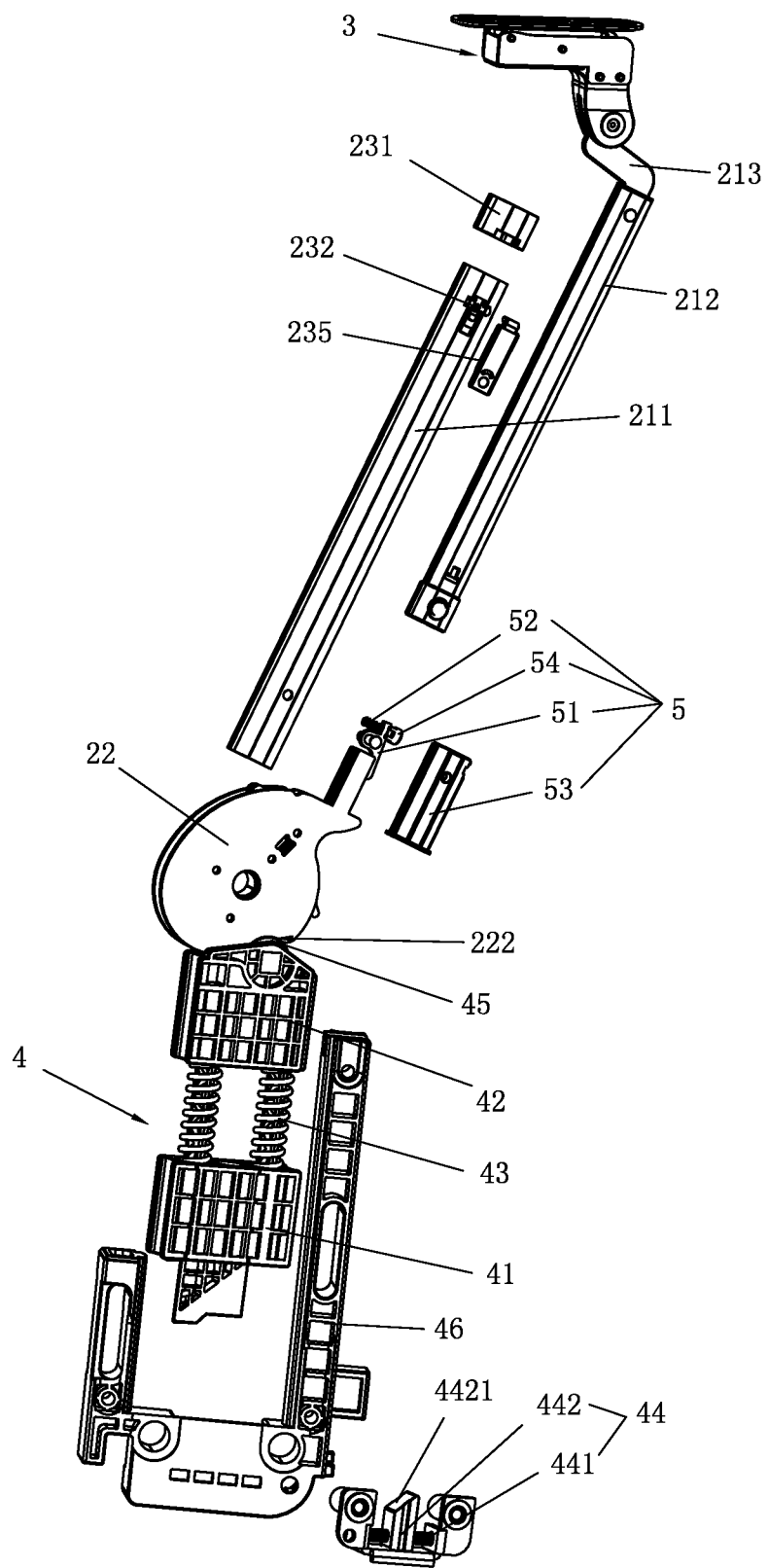
FIG. 3 is an exploded view of a hidden casing and a base in accordance with the present invention.
Figure 4:
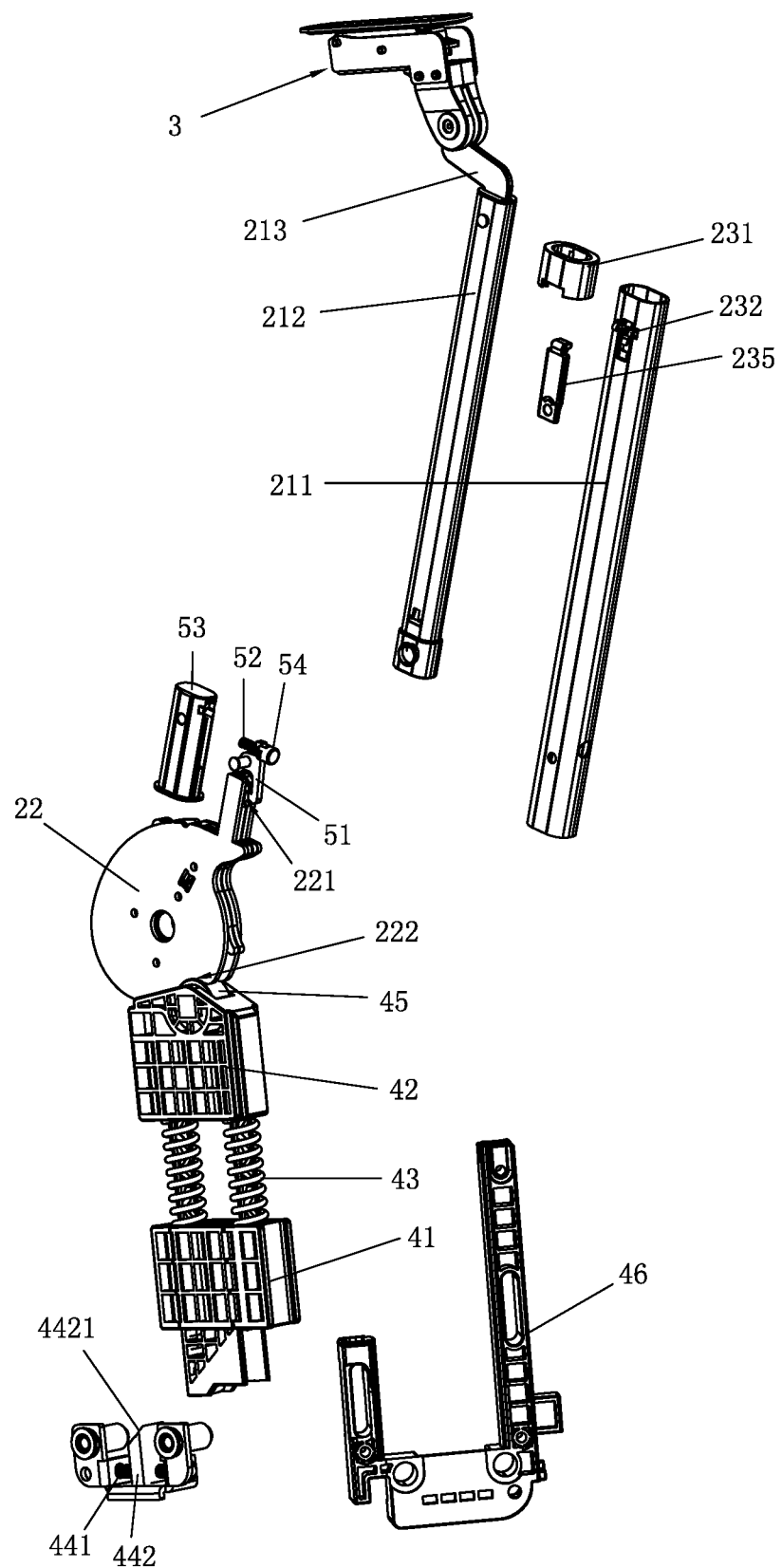
FIG. 4 is another exploded view of a hidden casing and a base in accordance with the present invention.
Figure 5:
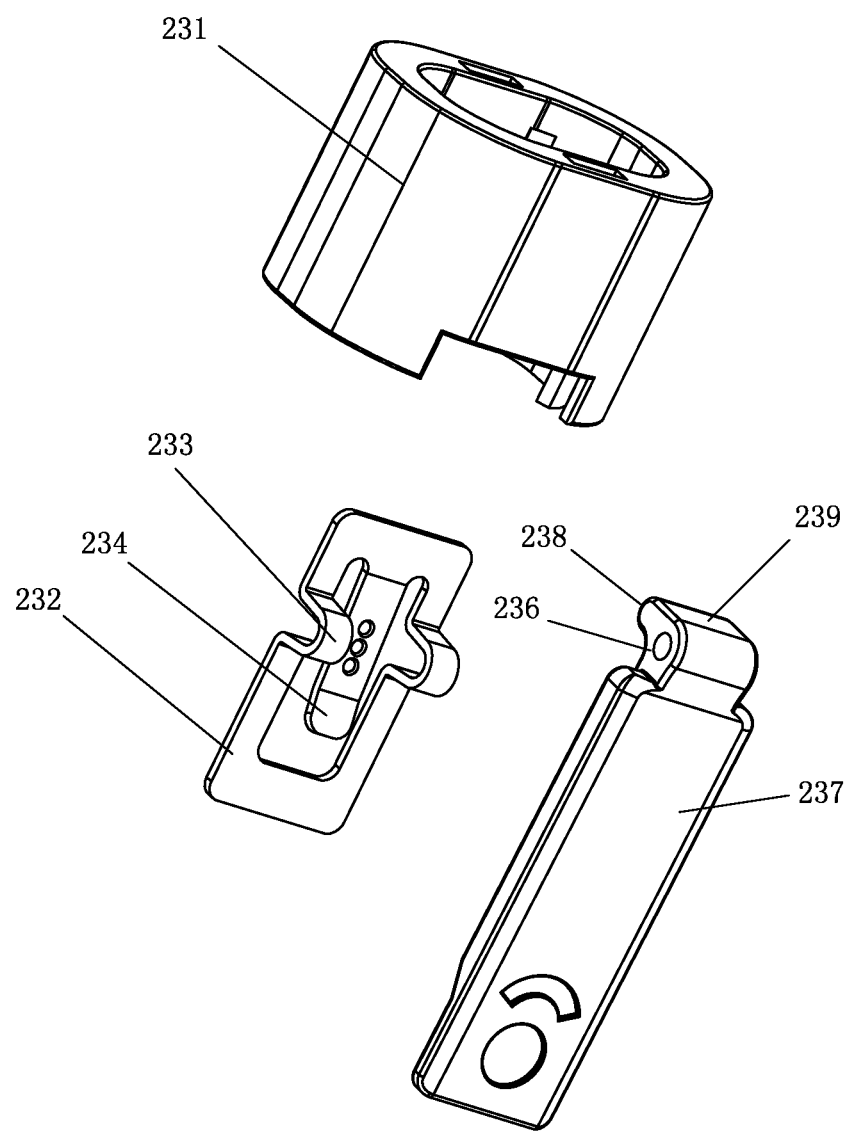
FIG. 5 is an exploded view of a fixed structure in accordance with the present invention.
Figure 6:
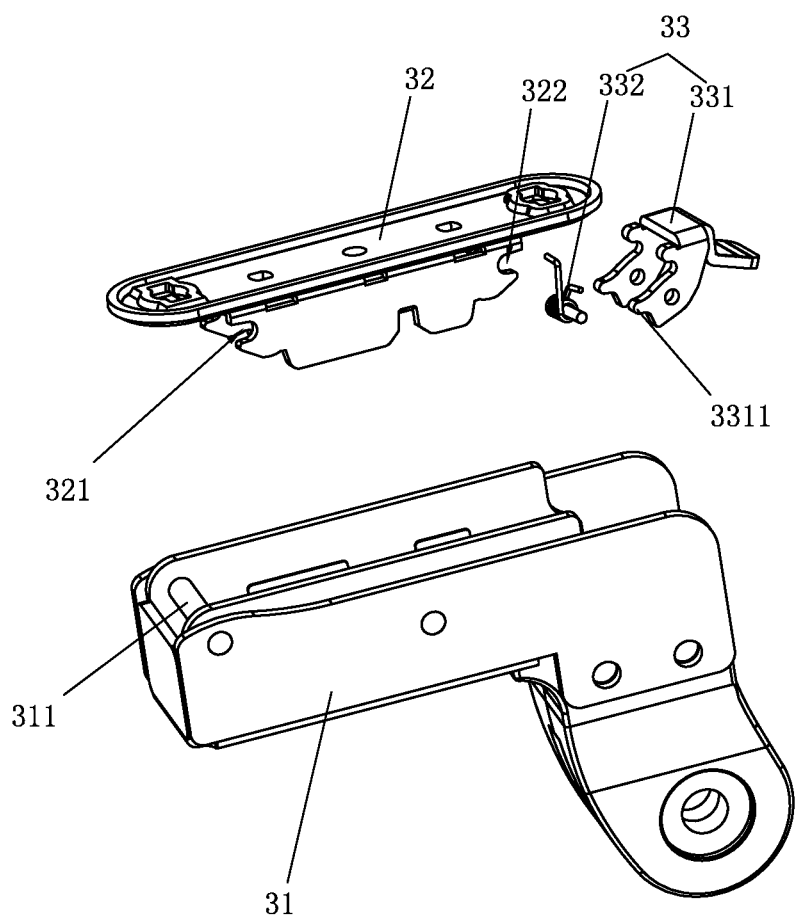
FIG. 6 is an exploded view of a fixed seat of the present invention.

The technical contents of the present invention will become apparent with the detailed description of preferred embodiments accompanied with the illustration of related drawings as follows. It is intended that the embodiments and figures disclosed herein are to be considered illustrative rather than restrictive.

With reference to FIGS. 2 to 6 for a support device of the present invention, the support device comprises a base 1, a support mechanism 2, a fixed seat 3, and a force providing mechanism 4 installed to the base 1. The support mechanism 2 comprises a support element 21 and a rotating element 22 rotatably installed to the base 1. The support assembly 21 has an end hinged to the fixed seat 3 and the other end having a disassembling structure 5 for detachably coupling the rotating element 22. The rotating element 22 abuts the force providing mechanism 4, wherein the force providing mechanism 4 is provided for supporting the rotating element 22. The disassembling structure 5 comprises a fastening element 51 and an elastic element 52, and a fastening slot 221 is formed at an end of the rotating element 22 proximate to the fastening element 51, and the middle of the fastening element 51 is rotatably coupled to the support element 21, and an end of the fastening element 51 is provided for extending into the fastening slot 221, and the elastic element 52 is provided for driving the other end of the fastening element 51 to restore its original position. Preferably, the fastening element 51 is in form of a hook.

During assembling, the fixed seat 3 is installed to an end of the support mechanism 2, and the disassembling structure 5 is installed to the other end of the support element 21, and then the fastening element 51 is pressed to a position near an end of the elastic element 52, and the elastic element 52 is compressed, such that the fastening element 51 rotates around a rotation point, and an end of the fastening element 51 away from the elastic element 52 swings outward. When the rotating element 22 has an end of the fastening slot 221 plugged into the disassembling structure 5 and/or the support assembly 21, the pressing force exerted on the fastening element 51 is released, and the fastening element 51 under the effect of the elastic force of the elastic element 52 resets and swings, so that an end of the fastening element 51 extends into the fastening slot 221. With the fastening element 51 in coordination with the fastening slot 221, the disassembling structure 5 and the rotating element 22 can be installed. During disassembling, the other end of the fastening element 51 is pressed, so that an end of the fastening element 51 retreats from the fastening slot 221 to achieve the effect of removing the disassembling structure 5 and the rotating element 22. In actual use, an external downward force is applied to the fixed seat 3 to move the fixed seat 3 downward, and the fixed seat 3 drives the support assembly 21 to swing downward, and the support assembly 21 drives the rotating element 22 to rotate clockwise, and the rotating element 22 abuts the force providing mechanism 4 and compresses the force providing mechanism 4. When the external force exerted on the fixed seat 3 is eliminated, the force providing mechanism 4 provides a support force to the rotating element 22 to stop rotating the rotating element 22, and the support force of the force providing mechanism 4 is acted onto the fixed seat 3 through the support mechanism 2, so as to achieve the effect of supporting the fixed seat 3, and the movement of the fixed seat 3 stops when the external force is eliminated, so that the fixed seat 3 can stop at will within a certain angle to improve the stability of the fixed seat 3 and reduce the production of noises. When the fixed seat 3 is pulled to move upward, the fixed seat 3 drives the support assembly 21 to swing upward, and the support assembly 21 drives the rotating element 22 to rotate counterclockwise. During the process of rotating the rotating element 22 counterclockwise, the force providing mechanism 4 spreads out and restores its original position and abuts the rotating element 22. When the rotating element 22 is rotated to a predetermined angle, the force providing mechanism 4 provides an upward support force to the rotating element 22, and the support force can offset the weight of the fixed seat 3 and the weight of a folding board 8 installed onto the fixed seat 3 to reduce the labor intensity required for driving the support assembly 21 to turn upward, so as to achieve the labor-saving effect and improve the efficiency of turning the support assembly 21 upward. The support device has the features of ingenious design, convenient installation and removal of the support element 21 and the rotating element 22, quick, simple and labor-saving operation, stable work of turning the support element 21 upward, low noises and high practicality. In addition, the fixed seat 3 can stop at will within a certain angle.

In this embodiment, the disassembling structure 5 further comprises a mounting sleeve 53 installed at the other end of the support assembly 21, and a pressing element 54 slidably installed to the mounting sleeve 53, and the pressing element 54 has an end protruded from the support assembly 21 and the other end abutting the other end of the fastening element 51, and the pressing element 54 and the elastic element 52 are disposed on both sides of the fastening element 51 respectively, and the middle of the fastening element 51 is rotatably coupled to the mounting sleeve 53, and the pressing element 54 compresses the elastic element 52 through the fastening element 51. Preferably, the elastic element 52 is a pressure spring, and the pressure spring has an end abutting the fastening element 51 and the other end abutting the mounting sleeve 53, and the mounting sleeve 53 has a giving-way slot provided for the rotation of the fastening element 51, and the fastening slot 221 is disposed in the mounting sleeve 53 and exposed from the giving-way slot. During disassembling, the pressing element 54 is pressed or released to rotate or restore the fastening element 51 to its original position, so as to separate or extend an end of the fastening element 51 from or into the fastening slot 221, and achieve the effect of removing the support assembly 21 and the rotating element 22, and the operation is quick and convenient, and thus increasing the installation and removal efficiency greatly.

In this embodiment, the support element 21 comprises a first support rod 211, a second support rod 212, a hinged arm 213 and a fixed structure 23, wherein the hinged arm 213 has an end hinged to the fixed seat 3 and the other end detachably coupled to an end of the second support rod 212, and the other end of the second support rod 212 is slidably coupled to an end of the first support rod 211, and the fixed structure 23 is provided for fixing the second support rod 212 to the first support rod 211, and the disassembling structure 5 is installed to the other end of the first support rod 211. When the fixed structure 23 releases the second support rod 212, the second support rod 212 can slide along the first support rod 211. In other words, the second support rod 212 can stretch or retreat along the first support rod 211 to achieve the effects of adjusting the length of the support assembly 21, expanding the scope of applicability of the support device, modularizing the support element 21, facilitating the maintenance, storage and packaging of the support element 21, and lowering the maintenance cost.

In this embodiment, the fixed structure 23 comprises a sliding sleeve 231 installed at an end of the first support rod 211 and an elastic plate 232 installed to the first support rod 211, and the elastic plate 232 is disposed between the first support rod 211 and the second support rod 212, and the elastic plate 232 has a hinged ear 233 and an abutting plate 234 for abutting the second support rod 212. The hinged ear 233 is protruded from the first support rod 211, and the hinged ear 233 is hinged to a fixed switch 235, and the fixed switch 235 limits the second support rod 212 at the first support rod 211 through the abutting plate 234. Preferably, the abutting plate 234 has a plurality of bumps for abutting a side of the second support rod 212 and increasing the friction between the elastic plate 232 and the second support rod 212, so that the fixed switch 235 can limit another support element on the first support rod 211 through the elastic plate 232, so as to guarantee the stability of the support element 21.

In this embodiment, the fixed switch 235 comprises a hinge portion 236 hinged to the hinged ear 233 and a handle portion 237 coupled to the hinge portion 236, and the hinge portion 236 has a fixed portion 238 protruded from a side of the hinge portion 236 and an abutting surface 239 disposed at the top of the hinge portion 236. When the fixed portion 238 abuts the abutting plate 234, the abutting plate 234 attaches the second support rod 212 closely to fix the second support rod 212 to the first support rod 211. When the abutting surface 239 abuts the abutting plate 234, the abutting plate 234 releases the second support rod 212 to slidably couple the second support rod 212 to the first support rod 211.

When the fixed portion 238 of the fixed switch 235 abuts the abutting plate 234, the fixed portion 238 is protruded outwardly, so that the abutting plate 234 fixes the second support rod 212 onto the first support rod 211. Now, the handle portion 237 of the fixed switch 235 is parallel to the support assembly 21. When it is necessary to release the second support rod 212, the handle portion 237 is driven to rotate along the hinged point, so that the fixed switch 235 and the support element 21 are crossed, and the abutting surface 239 of the hinge portion 236 abuts the abutting plate 234. Since the hinge portion 236 is a plane, and a gap exists between the abutting plate 234 and the second support rod 212, therefore when the abutting plate 234 is released from the second support rod 212, the second support rod 212 can slide along the first support rod 211.

In this embodiment, the force providing mechanism 4 comprises a fixed plate 41, a sliding seat 42 and a spring 43. The fixed plate 41 is installed to the base 1, and the sliding seat 42 is slidably installed to the base 1. The spring 43 has an end abutting the sliding seat 42 and the other end abutting the fixed plate 41, and the rotating element 22 abuts the sliding seat 42. Specifically, the fixed plate 41 and the sliding seat 42 have a fixed hole for receiving the spring 43, and the fixed hole improves the stability of the spring 43. The force providing mechanism 4 has the features of simple structure, ingenious design, stable and reliable operation and the effects of improving the stability of supporting the force providing mechanism 4 by the support mechanism 2 and guaranteeing the support effect of the force providing mechanism 4. Preferably, the quantity of the spring 43 is two to three, in order to further improve the stability of providing the support force by the force providing mechanism 4 and the range of adjusting the support force.

Preferably, the force providing mechanism 4 further comprises a guide rail 46 slidably installed on both sides of the fixed plate 41 and/or the sliding seat 42, and the guide rail 46 is installed to the base 1. By adding the guide rail 46 to guide the sliding of the fixed plate 41 and the sliding seat 42, the stability of the fixed plate 41 and the sliding seat 42 is improved to prevent the fixed plate 41 and the sliding seat 42 from swinging while sliding.

In this embodiment, the support device further comprises an adjusting mechanism 44 for adjusting a support force of the force providing mechanism 4, the adjusting mechanism 44 comprises a stud 441 rotatably installed to the base 1 and a thread coupled to an adjusting element 442 of the stud 441, and the adjusting element 442 has a first adjusting bevel 4421, and the bottom of the fixed plate 41 has a second adjusting bevel slidably matched with the first adjusting bevel 4421, and the fixed plate 41 is slidably installed to the base 1.

When it is necessary to adjust the support force of the force providing mechanism 4, users simply need to drive the stud 441 to rotate, so that the adjusting element 442 moves sideway along the stud 441, and the first adjusting bevel 4421 of the adjusting element 442 that moves sideway abuts the second adjusting bevel of the fixed plate 41, so that the fixed plate 41 moves up and down, and the fixed plate 41 adjusts the elastic force of the spring 43, so as to adjust the elastic force of the force providing mechanism 4. Users can adjust the position of the adjusting element 442 according to the actual required support force.

In this embodiment, the sliding seat 42 has a wheel 45 rotatably installed thereto for abutting the rotating element 22 and provided for facilitating the rotating element 22 to abut the force providing mechanism 4 to produce a relative rolling, while decreasing the friction between the rotating element 22 and the force providing mechanism 4, so as to reduce the worn-out of the rotating element 22 and the force providing mechanism 4 and extend the service life of the rotating element 22 and the force providing mechanism 4. The rotating element 22 has a limit slot 222 for receiving the wheel 45. When the rotating element 22 is rotated to a predetermined angle, the wheel 45 is received into the limit slot 222, and the limit slot 222 limits the position of the wheel 45 to prevent the angle of rotation of the rotating element 22 from exceeding a predetermined stroke to guarantee the stability of the angle of rotation of the rotating element 22.

In this embodiment, the fixed seat 3 comprises a casing 31 coupled to the support element 21, a fastener 32 coupled to the casing 31, and an opening/closing assembly 33 for limiting the fastener 32 in the casing 31, and the fastener 32 has a latch groove 321 in coordination with the casing 31, and a fastening groove 322 in coordination with the opening/closing assembly 33, and the latch groove 321 and the fastening groove 322 are formed at both ends of the fastener 32 respectively, and the fastener 32 is provided for coupling an external panel.

The casing 31 and the fastener 32 are detachably coupled to each other to facilitate the installation and removal of the casing 31 and the fastener 32. When the casing 31 and the fastener 32 are assembled, the fastener 32 is installed to the casing 31, and the fastener 32 and the casing 31 are closed, so that the opening/closing assembly 33 limits the fastener 32 in the casing 31, and the latch groove 321 of the fastener 32 is latched to the casing 31, and the fastening groove 322 of the fastener 32 is fastened to the opening/closing assembly 33. During disassembling, the opening/closing assembly 33 is pressed, so that the opening/closing assembly 33 is rotated, and the opening/closing assembly 33 is separated from the fastening groove 322 of the fastener 32, so that the fastener 32 and the casing 31 are opened. We simply need to move the fastener 32 transversely, so that the latch groove 321 of the fastener 32 is separated from the casing 31 to achieve the effect of disassembling the fastener 32 and the casing 31. The fixed seat 3 has the features of simple and compact structure. With the latch groove 321 and the fastening groove 322 of the fastener 32 coupled to the casing 31 and the opening/closing element 33 respectively, the opening/closing element 33 can control opening and closing status of the fastener 32 and the casing 31. The operation is simple and the work is stable. The fastener 32 and the casing 31 can be installed or removed conveniently to improve the users' installation/removal efficiency and the folding furniture is easy to use in daily life.

Specifically, the opening/closing element 33 comprises an opening/closing element 331 rotatably coupled to the casing 31 and an opening/closing torque spring 332 installed between the opening/closing element 331 and the casing 31, wherein the opening/closing torque spring 332 has an end abutting the opening/closing element 331 and the other end abutting the casing 31, and the opening/closing element 331 has a fastening portion 3311 extending into the fastening groove 322, and the casing 31 has a latch shaft 311 received into the latch groove 321.

The latch shaft 311 of the casing 31 is latched into the latch groove 321 of the fastener 32. With the latch groove 321 in coordination with the latch shaft 311, the position precision and efficiency of assembling the casing 31 and the fastener 32 are improved, and the casing 31 and the fastener 32 can be installed or removed conveniently. When the fastener 32 is installed or removed, the opening/closing element 331 is pressed, such that the opening/closing element 331 rotates with respect to the casing 31, and the opening/closing element 331 compresses the opening/closing torque spring 332, such that the fastening portion 3311 is separated from the fastening groove 322 of the fastener 32, and the pressing force exerted on the opening/closing element 331 is released, and the opening/closing torque spring 332 drives the opening/closing element 331 to resume its original position, such that the fastening portion 3311 is fastened to the fastening groove 322 of the fastener 32 to achieve the effect of opening or closing the fastener 32 and the casing 31. The opening/closing element 33 has the features of simple structure, quick response, stable opening/closing, and fast operation, so that the fastener 32 and the casing 31 can be installed or removed conveniently.

Preferably, the base 1 has a casing 6 covering thereon, and the casing 6 is provided for protecting the internal structure (such as the force providing mechanism 4) of the base 1.

In FIG. 1, the present invention further provides a folding furniture having a support device, and the folding furniture comprises a furniture body 7 and a folding board 8 hinged to the furniture body 7, and further comprises the aforementioned support device, wherein the base 1 of the support device is installed to the furniture body 7, and the fixed seat 3 of the support device is coupled to an end of the folding board 8, and the other end of the folding board 8 is rotatably installed to the furniture body 7, and the support device drives the folding board 8 to spread out or fold. The folding furniture having the support device has the technical effect of the support device as described above, and thus will not be repeated.

All technical characteristics of this embodiment may be combined freely according to actual requirements.

While the present invention has been described by means of specific embodiments, numerous modifications and variations could be made thereto by those skilled in the art without departing from the scope and spirit of the present invention set forth in the claims.

What is claimed is:

1. A support device, comprising: a base, a support mechanism, a fixed seat and a force providing mechanism installed to the base, and the support mechanism comprising a support element and a rotating element rotatably installed to the base, and the support mechanism having an end hinged to the fixed seat and the other end with a disassembling structure for detachably coupling the rotating element, and the rotating element abutting the force providing mechanism, and the force providing mechanism being provided for supporting the rotating element.

2. The support device of claim 1, wherein the disassembling structure comprises a fastening element and an elastic element, and an end of the rotating element proximate to the fastening element has a fastening slot, and the middle of the fastening element is rotatably coupled to the support element, and an end of the fastening element extends into the fastening slot, and the elastic element is provided for driving the other end of the fastening element to restore its original position.

3. The support device of claim 2, wherein the disassembling structure further comprises a mounting sleeve installed to the other end of the support assembly and a pressing element slidably installed to the mounting sleeve, and the pressing element has an end protruded from the support assembly and the other pressing element abutting the other end of the fastening element, and the pressing element and the elastic element are disposed on both sides of the fastening element respectively, and the middle of the fastening element is rotatably coupled to the mounting sleeve, and the pressing element compresses the elastic element through the fastening element.

4. The support device of claim 1, wherein the support element comprises a first support rod, a second support rod, a hinged arm and a fixed structure, and the hinged arm has an end hinged to the fixed seat and the other end coupled to an end of the second support rod, and the other end of the second support rod is slidably coupled to an end of the first support rod, and the fixed structure is provided for limiting the second support rod at the first support rod, and the disassembling structure is installed at the other end of the first support rod.

5. The support device of claim 4, wherein the fixed structure comprises a sliding sleeve installed to an end of the first support rod and an elastic plate installed to the first support rod, and the elastic plate is disposed between the first support rod and the second support rod, and the elastic plate has a hinged ear and an abutting plate for abutting second support rod, and the hinged ear is protruded from the first support rod and hinged to the fixed switch, and the fixed switch is provided for fixing the second support rod to the first support rod through the abutting plate.

6. The support device of claim 5, wherein the fixed switch comprises a hinge portion hinged to the hinged ear, a handle portion coupled to the hinge portion, and a fixed portion protruded from a side of the hinge portion, and an abutting surface disposed at the top of the hinge portion, and when the fixed portion abuts the abutting plate, the abutting plate attaches the second support rod closely, so that the second support rod is fixed to the first support rod, and when the abutting surface abuts the abutting plate, the abutting plate releases the second support rod, so that the second support rod is slidably coupled to the first support rod.

7. The support device of claim 1, wherein the force providing mechanism (4) comprises a fixed plate, a sliding seat and a spring, and the fixed plate is installed at the base, and the sliding seat is slidably installed to the base, and the spring has an end abutting against the sliding seat and the other end abutting the fixed plate, and the rotating element abuts the sliding seat; the force providing mechanism further comprises slidably installed to the fixed plate and/or a guide rail on both sides of the sliding seat, and the guide rail is installed to the base.

8. The support device of claim 7, further comprising an adjusting mechanism for adjusting a support force of the force providing mechanism, and the adjusting mechanism comprising a stud rotatably installed thereto, and a thread coupled to an adjusting element of the stud, and the adjusting element having a first adjusting bevel, and the bottom of the fixed plate having a second adjusting bevel slidably matched with the first adjusting bevel, and the fixed plate is slidably installed to the base.

9. The support device of claim 1, wherein the fixed seat comprises a casing coupled to the support element, a fastener coupled to the casing, and an opening/closing assembly for limiting the fastener to the casing, and the fastener has a latch groove in coordination with the casing and a fastening groove in coordination with the opening/closing assembly, and the latch groove and the fastening groove are disposed at both ends of the fastener respectively, and the opening/closing element comprises an opening/closing element rotatably coupled to the casing, and an opening/closing torque spring installed between the opening/closing element and the casing, and the opening/closing torque spring has an end abutting the opening/closing element and the other end abutting the casing, and the opening/closing element has a fastening portion extending into the fastening groove, and the casing has a fastening shaft received in the latch groove.

10. A folding furniture having a support device, comprising a furniture body and a folding board hinged to the furniture body and further comprising the support device according to claim 1, and the base of the support device being mounted onto the furniture body, and the fixed seat of the support device being coupled to an end of the folding board and the other end of the folding board being rotatably installed to the furniture body, and the support device driving the folding board to be spread out or folded.

* * * * *